(12) United States Patent
Descamps et al.

(10) Patent No.: US 8,414,955 B2
(45) Date of Patent: Apr. 9, 2013

(54) METHOD TO STABILIZE THE CRYSTALLIZATION OF A BLEND OF FAT AND OIL CONTAINING MORE THAN 10% COCOA BUTTER AND HAVING A LOW TRANS FAT CONTENT

(75) Inventors: Pierre Descamps, Silly (BE); Yves Kegelaers, Brussels (BE)

(73) Assignee: Puratos Naamloze Vennootschap, Groot-Bijgaarden (BE)

( * ) Notice: Subject to any disclaimer, the term of this patent is extended or adjusted under 35 U.S.C. 154(b) by 0 days.

(21) Appl. No.: 12/303,029

(22) PCT Filed: Jun. 1, 2007

(86) PCT No.: PCT/EP2007/055426
§ 371 (c)(1),
(2), (4) Date: Feb. 5, 2009

(87) PCT Pub. No.: WO2007/141222
PCT Pub. Date: Dec. 13, 2007

(65) Prior Publication Data
US 2009/0238946 A1    Sep. 24, 2009

(30) Foreign Application Priority Data

Jun. 2, 2006 (EP) .................... 06114948

(51) Int. Cl.
*A23G 1/00* (2006.01)
(52) U.S. Cl. .............. 426/631; 426/607; 426/659
(58) Field of Classification Search .......... 426/631, 426/607, 659, 572
See application file for complete search history.

(56) References Cited

U.S. PATENT DOCUMENTS

| | | | | |
|---|---|---|---|---|
| 2,975,061 A | * | 3/1961 | Soeters et al. ............ | 426/607 |
| 2,975,062 A | * | 3/1961 | Soeters et al. ............ | 426/607 |
| 3,012,891 A | * | 12/1961 | Best et al. ............... | 426/607 |
| 4,276,322 A | * | 6/1981 | Padley et al. ............ | 426/660 |
| 4,859,483 A | * | 8/1989 | Sollich .................. | 426/519 |
| 5,104,680 A | * | 4/1992 | Padley et al. ............ | 426/602 |
| 5,264,234 A | * | 11/1993 | Windhab et al. .......... | 426/519 |
| 5,514,390 A | * | 5/1996 | Aasted ................. | 426/231 |
| 6,022,577 A | | 2/2000 | Chrysam et al. | |
| 6,099,886 A | * | 8/2000 | Takemori et al. .......... | 426/515 |
| 2006/0129836 A1 | * | 6/2006 | Kao et al. ............... | 713/184 |

FOREIGN PATENT DOCUMENTS

| | | |
|---|---|---|
| EP | 1 243 182 A2 | 9/2002 |
| EP | 1 491 097 A | 12/2004 |
| GB | 827172 * | 2/1960 |
| GB | 925805 * | 5/1963 |
| WO | WO 03/037095 A | 5/2003 |
| WO | WO 03/053152 | 7/2003 |

OTHER PUBLICATIONS

Minifie, B. 1980. Chocolate, Cocoa and Confectionery: Science and Technology, 2nd edition. AVI Publishing Company, Inc., Westport, CT. p. 71, 107, 112, 113, 146-149.*
Beckett, S. T. 1994. Industrial Chocolate Manufacture and Use, 2nd edition. Blackie Academic & Professional, New York. p. 187-190, 276-279.*
Minifie, B. 1980. Chocolate, Cocoa and Confectionery: Science and Technology 2nd edition. AVI Publishing Company, Inc., Westport, CT p. 80-87.*
International Search Report issued in connection with corresponding PCT application No. PCT/EP2007/055426 dated Sep. 24, 2007.
Almond, N., Gordon M. H., Reardon P., & Wade, P. (Eds.). (1991.) Cocoa butter substitutes—Nonlauric cocoabutter replacers. In *Biscuits, Cookies and Crackers, Composite Products* (vol. 3, Chap. 2.6.2, pp. 38-39). London: Elsevier Applied Science.

* cited by examiner

*Primary Examiner* — Carolyn Paden
(74) *Attorney, Agent, or Firm* — Knobbe Martens Olson & Bear LLP

(57) ABSTRACT

The invention relates to method for preparing a chocolate composition comprising at least 10% cocoa butter, said method comprising the steps of: (a) Preparing a chocolate mixture comprising at least 10% cocoa butter by admixing a chocolate mass with a blend of an oil and/or fat having a Solid Fat Content higher than 2% when measured at 30° C. with IUPAC method 2.150 a, and having a Trans Fatty Acid Content below 4%, preferably below 2%, (b) Feeding this mixture in molten state to a scraped surface heat exchanger, wherein the temperature of the scraped surface is below +10° C., advantageously is below 0° C., (c) Crystallization and stabilization of said melt with the aid of said scraped surface heat exchanger, (d) Optionally, extrusion of the thus chilled mixture in block shape. This method advantageously allows the preparation of trans-free chocolate fillings, advantageously without the need of specialty products. The invention further relates to the prepared chocolate fillings and their applications in the chocolate industry.

36 Claims, 1 Drawing Sheet

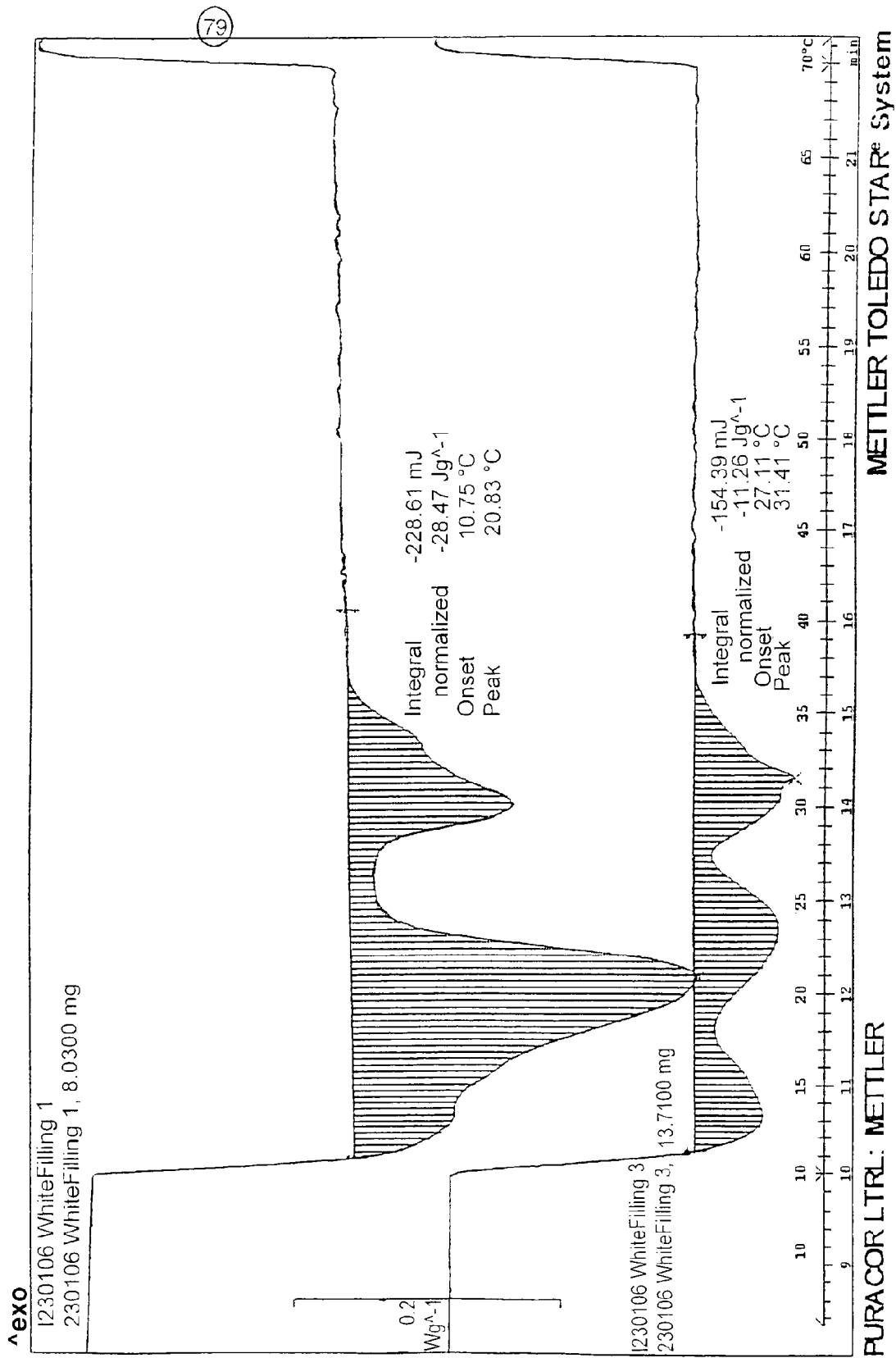

METHOD TO STABILIZE THE CRYSTALLIZATION OF A BLEND OF FAT AND OIL CONTAINING MORE THAN 10% COCOA BUTTER AND HAVING A LOW TRANS FAT CONTENT

RELATED APPLICATIONS

This application is the U.S. National Phase filing under 35 U.S.C. §371 of PCT/EP2007/055426, filed Jun. 1, 2007, entitled "Method to stabilize the crystallization of a blend of fat and oil containing more than 10% cocoa butter and having a low trans fat content", which designated the United States and was published in English on Dec. 13, 2007, which claims priority under 35 U.S.C. §119(a)-(d) to European Patent Application No. 06114948.0, filed Jun. 2, 2006.

FIELD OF THE INVENTION

The invention relates to a novel method for preparing chocolate products (e.g. fillings) that allows to obtain a high-quality, well crystallized and stable product even when more than 10% of cocoa butter is blended with a (vegetable) low trans-fat/oil that has e.g. a fatty acid profile and/or crystallization rate (quite) different from that of cocoa butter. The invention further relates to products thus obtained and their applications.

BACKGROUND

In response to an increased public concern about negative health effects of trans-fatty acids the food industry faces the task of replacing hydrogenated fats in product formulations with trans-free alternative fats or with fats having a low trans-fat content.

The confectionary and baking industries are particularly concerned, because for their highly demanding fat applications it has proved difficult to find non-hydrogenated fats that are both economical and functional alternatives to hardened fats.

The problem of providing products with a low percentage of trans fatty acids (less than 10%, preferably less than 5%, most preferably less than 2%) is even bigger in the field of chocolate applications.

The mixing between "real" chocolate and vegetable fats/oils is known. Yet, when vegetable fats and/or oils other than Cocoa Butter Equivalents (CBE), or other than Cocoa Butter Replacers (CBR) based on hydrogenated fats (see below), are mixed with cocoa butter, a high-quality, stable, homogeneous and well crystallized chocolate product with the desired texture is not easy to obtain.

Cocoa butter (CB) has some particular properties. CB is a stiff solid at room temperature, but melts smoothly in the mouth. It has a narrow melting range and shows specific shrinking properties on cooling to solidify.

CB is a polymorphic product and the fats therein can crystallize in six different forms (polymorphous crystallization). Making good chocolate is about forming the most of the type V crystals (Beta form). Tempering is therefore an important step in the production of chocolate and chocolate products such as fillings.

A CBE is a fat which does not alter physical properties of CB in any mixture with CB. This type of fat therefore must have a composition very similar to that of CB (see e.g. WO 03/037095).

A CBE composition is a fat composition of which the solid fat content measured at 30° C. with IUPAC method 2.150 a, the fat composition not being subjected to a thermal treatment, differs at least 8% absolute from the solid fat content measured at the same temperature with IUPAC method 2.150b, the fat composition this time being subjected to a thermal treatment program described in that method (see WO 03/053152).

Another group of vegetable fats and/or oils (fats/oils) that are quite easy to blend with real chocolate is formed by the Cocoa Butter Replacers (CBR) based on hydrogenated fats or on the non-tempering and non-lauric fats (see WO 03/053152 and WO 03/037095).

Traditional type CBR fats are produced from standard raw materials for oil and fats such as palm oil, soybean oil and rapeseed oil. These CBR products crystallize directly into the stable crystal form when cooled. This means that in contrast to cocoa butter and CBE, no tempering is needed. In addition, CBR—and in particular the traditional type—are fast setting fats.

This type of vegetable oils, however, are hydrogenated under selective conditions (a process referred to as "partial hydrogenation") so that the naturally occurring cis unsaturated fatty acids are largely converted into trans unsaturated fatty acids with very little formation of saturated fatty acids. A hardened fat fraction of this type is compatible with up to 25% of cocoa butter (*Biscuits, cookies and Crackers, Vol.* 3; 2.6.2 *Cocoa butter substitutes—Nonlauric cocoabutter replacers*, Almond N., Gordon M. H., Reardon P, Wade P (eds), Elsevier Applied Science, 1991, London).

There are several reports that indicate an incompatibility of different types of non-hydrogenated fats and oils when used in combination with more than 10% (w/w) cocoa butter (CB) in standard methods and applications. This incompatibility would be caused amongst others by a different crystallization rate founded in different fatty acids compositions and triglyceride structures of the fats.

Danisco has produced specialty emulsifier blends to secure fast fat crystallization and to help food makers use trans-free fats without loosing functionality.

Another approach has existed in the use of new specialty fats like some trans-free palm oil fractions that have been developed to have a crystallization rate as close as possible to that of hydrogenated fats.

However, despite of the equal crystallization rates of hydrogenated fats and of these trans-free alternatives as measured on the pure fat, there are still differences between the crystallization behavior of both, which appears to require the adjustment of existing process technologies in some applications.

In hydrogenated fats the fast crystallizing trans-fatty acids are present in the majority of triglycerides which facilitates an even and continuous crystallization process of the bulk of a hydrogenated fat during cooling.

In the non-hydrogenated trans-free fat blends, a rapid solidification onset followed by a slower completion of crystallization of the remaining fat phase is observed.

Also WO 03/037095 discloses particular trans-free fat fractions tailored to be compatible with fats that require tempering like cocoa butter (CB). The non-LTT specialty fats disclosed herein have a crystallization rate comparable to that of trans-hydrogenated fats.

EP 1 491 097 discloses a method for producing particular hydrogenated low-trans non-tempering fats with a steep SFC profile for confectionary applications. The trans-fatty acids (TFA) content of the fats actually used in said documents is at least 7 wt. %.

There is thus a demand for novel and improved processes that allow the production of trans-free chocolate products (e.g. fillings), in particular for chocolate products (e.g. fillings) with a TFA content lower than 2% or even lower than 1%, without the need to use specialty products.

Because chocolate and chocolate products such as fillings are used in a vast number of foods, any change in the cost of making such products has a huge impact on the industry.

AIMS OF THE INVENTION

It is an aim of the invention to overcome the drawbacks of the prior art.

It is an aim of the invention to provide a novel method for preparing high-quality and stable chocolate products (e.g. real chocolate fillings) containing more than 10% cocoa butter or more than 50% chocolate.

It is another aim of the invention to provide a method allowing the use of plain fats(s) and/or oil(s) of vegetable and/or animal origin. Such fats have often very slow crystallization rates compared to cocoa butter and hydrogenated fats.

It is a further aim of the invention to provide such methods that allow the preparation of low trans-fat chocolate products such as fillings, in particular real chocolate fillings.

Another aim of the invention is to provide stable and plasticized chocolate fillings, in particular real chocolate fillings, with an excellent appearance and texture, melting behavior, palatability, taste and shelf life.

DESCRIPTION OF THE FIGURES

FIG. 1 present a DSC chromatogram for a real chocolate filling prepared according to a method of the invention and a filling prepared according to a classical and manual tempering technique.

SUMMARY OF THE INVENTION

The invention provides for novel and inventive methods for the preparation of chocolate compositions such as real chocolate fillings, which are crystallized with the aid of a (cold) scraped surface heat exchanger (SSHE).

The invention provides amongst others a method for preparing a chocolate composition comprising at least 10% cocoa butter, said method comprising the steps of:

(a) Preparing a chocolate mixture comprising at least 10% (w/w) cocoa butter by admixing a chocolate mass with a blend of an oil and/or fat, preferably of vegetable origin, having a Solid Fat Content above 2% (on the total weight), when measured at 30° C. with IUPAC method 2.150a, and having a Trans Fatty Acid Content below 4%, preferably below 2% (percentages on the total Fatty Acid content), (b) Feeding this mixture in molten state to a scraped surface heat exchanger (SSHE), wherein the temperature of the scraped surfaces is preferably below +10° C., (c) Crystallization and stabilization of said melt with the aid of said scraped surface heat exchanger, and (d) optionally, extrusion of the thus chilled mixture in block shape.

The blend of the invention (as defined above) advantageously consists of oil and/or fat. In particular, the blend of the invention advantageously contains no other ingredients than oil and/or fat.

In an embodiment of the invention, the chocolate mass is admixed with at least one fat that has a Solid Fat Content above 2% (on the total weight), when measured at 30° C. with IUPAC method 2.150a, and that has a Trans Fatty Acid Content below 4%, preferably below 2% (percentages on the total Fatty Acid content).

Provided is also a method for preparing a chocolate composition comprising at least 10% cocoa butter, said method comprising the steps of:

(a) Preparing a chocolate mixture comprising at least 10% (w/w) cocoa butter by admixing a chocolate mass with at least one fat that has a Solid Fat Content above 2% (on the total weight), when measured at 30° C. with IUPAC method 2.150a, and that has a Trans Fatty Acid Content below 4%, preferably below 2% (percentages on the total Fatty Acid content), (b) Feeding this mixture in molten state to a scraped surface heat exchanger (SSHE), wherein the temperature of the scraped surfaces is preferably below +10° C., (c) Crystallization and stabilization of said melt with the aid of said scraped surface heat exchanger, and (d) optionally, extrusion of the thus chilled mixture in block shape.

In case any oils are admixed with said at least one fat, then the proportion of fat and oil is such that the resulting blend has a Solid Fat Content above 2% (on the total weight), when measured at 30° C. with IUPAC method 2.150a, and has a Trans Fatty Acid Content below 4%, preferably below 2% (percentages on the total Fatty Acid content) (see above).

A method of the invention advantageously allows to stabilize the crystallization of the chocolate mixture of step (a) when fed to said scraped surface heat exchanger. In a preferred embodiment of the invention, the temperature of the scraped surfaces is below 0° C.

The method of the invention is especially suited for the preparation of (real) chocolate fillings and toppings. Before the chocolate product prepared according to the method of the invention can be used as filling or topping, the product obtained after step (c) or (d) is then plasticized, e.g. via a light heating and/or mechanical working. In particular, the chocolate composition may be heated to (about) 22° C.-28° C. to plasticize it.

Preferably the temperature of the scraped surface of the SSHE used in a method of the invention is between (about) +9° C. and (about) −30° C.

Excellent results were obtained with "cold" SSHE, of which the scraped surfaces have a temperature below +10° C., below 0° C., more preferably below −5° C., even more preferably between (about) −10° C. and (about) −25° C., and most preferably between (about) −15° C. and (about) −22° C.

The method of the invention advantageously allows the use of "plain" fat and/or oil in combination with more than 10%, more than 15%, even more than 20% CB. The term "plain" fat and/or oil as used herein explicitly excludes CBE, CBR based on hydrogenated fats, and any specialty fats designed to have a crystallization rate comparable to that of CB or that of hydrogenated fats.

In particular, the blend of an oil and/or fat advantageously is free from cocoa butter equivalents, free from cocoa butter replacers based on hydrogenated fats, and free from specialty fats designed to have a crystallization rate comparable to that of CB or that of hydrogenated fats.

Advantageously, with a method of the invention chocolate compositions (e.g. real chocolate fillings) are prepared that are free from (comprise no): cocoa butter equivalents, cocoa butter replacers based on hydrogenated fats, and specialty fats/oils designed to have a crystallization rate comparable to that of CB or that of hydrogenated fats.

Preferably the fats and/or oils that are added are of a non-hydrogenated, and preferably also of a non-lauric source or origin. They may be of vegetable and/or animal origin. Preferably vegetable fats/oils, possibly in combination with animal fats/oils are used. Milk fat and/or anhydrous butyric fat e.g. may be added to improve the taste.

In an embodiment of the invention one or more ingredients selected from the group consisting of anhydrous butyric fat, milk fat, palm oil, soja oil, rapeseed oil, cotton seed oil, palm kernel oil, coprah oil, their fractions (of any of these) and/or interesterified forms (of any of these) are admixed with the chocolate mass. In particular, one or more fats/oils selected from the group consisting of anhydrous butyric fat, milk fat, palm oil, soja oil, rapeseed oil, cotton seed oil, palm kernel oil, coprah oil; their fractions (of any of these) and/or interesterified forms (of any of these) may be admixed with the chocolate mass. The method of the invention—contrary to tempering methods—allows the preparation of stable and well crystallized chocolate products (e.g. (real) chocolate fillings) comprising these fats/oils and comprising more than 10% CB, and this within a very short time (e.g. less than 10 minutes, less than 6 minutes, less than 2 to 3 minutes).

Coprah oil, palm kernel oil and other lauric fats/oils are less suitable for the production of e.g. chocolate fillings, not because of a limitation of the method but because of the risk of fat bloom due to migration of this kind of fat/oil as known in the art.

Advantageously, the blend of an oil and/or fat is free from (comprises no): hydrogenated fats/oils and lauric fats/oils.

The chocolate mass advantageously is comprised of dark chocolate, milk chocolate, household chocolate, white chocolate and/or any mixture thereof.

The chocolate composition that is prepared preferably comprises (about) 20% to (about) 80%, more preferably (about) 40% to (about) 60% of chocolate (w/w, percentage on the total weight of the final product). In an embodiment of the invention, the chocolate composition comprises at least 50% of chocolate, in particular (about) 50% to (about) 80%, more in particular (about) 50% to (about) 60% of chocolate.

A chocolate composition with a Trans Fatty Acid content below 10%, preferably below 5%, below 4% and most preferably below 2% or even below 1% can be prepared as such. Percentages are on the total Fatty Acid content of the final product.

The method of the invention is in particular suited for the preparation of a chocolate filling or topping with a fat content between (about) 34% and (about) 80%, more preferably between (about) 40% and (about) 60% (w/w, percentage on the total weight of the final product).

A preferred product according to the invention is a "real" chocolate filling or topping suitable for use in or on chocolates, chocolate bars, pralines, cookies and/or pastry.

The invention in particular relates to chocolate compositions like such fillings/toppings obtainable by a method of the invention. Advantageously, after a simple plasticization (or softening) the compositions (fillings or toppings) of the invention are ready for use.

The invention for instance relates to a chocolate composition comprising a chocolate mass with at least 10% (w/w) cocoa butter, and comprising a blend of an oil and/or fat having a Solid Fat Content higher than 2% when measured at 30° C. with IUPAC method 2.150 a, and having a Trans Fatty Acid Content below 4%, preferably below 2%, possibly below 1%. Percentages (of cocoa butter) are weight percentages on the total weight of the final product (the chocolate composition, such as the real chocolate filler).

As mentioned before, the fats and/or oils added preferably are of a non-lauric and non-hydrogenated origin, especially when stable and trans-free products are envisaged.

The fats and/or oils used may be of vegetable and/or animal origin. Advantageously vegetable fats and/or oils, possibly in combination with animal fats and/or oils are used. Advantageously the fats and/or oils are non-hydrogenated fats/oils. More advantageously, they are non-hydrogenated non-lauric fats/oils.

Preferred chocolate compositions according to the invention comprise (about) 20% to (about) 80%, (about) 50% to (about) 80%, more preferably (about) 40% to (about) 60% (w/w), even more preferably (about) 50% to (about) 60% (w/w) of chocolate and further at least one ingredient selected from the group consisting of anhydrous butyric fat, milk fat, palm oil, soja oil, rapeseed oil, cotton seed oil, palm kernel oil, coprah oil, their fractions (of any of these) and/or interesterified forms (of any of these). Provided are also chocolate compositions consisting of (about) 20% to (about) 80%, (about) 50% to (about) 80%, more preferably (about) 40% to (about) 60% (w/w), even more preferably (about) 50% to (about) 60% (w/w) of chocolate and of at least one ingredient selected from the group consisting of anhydrous butyric fat, milk fat, palm oil, soja oil, rapeseed oil, cotton seed oil, palm kernel oil, coprah oil, their fractions (of any of these) and/or interesterified forms (of any of these). The amount of the oil and/or fat admixed with the chocolate: advantageously from (about) 80% to (about) 20%, from (about) 50% to (about) 20%, more preferably from (about) 60% to (about) 40% (w/w), most preferably from (about) 50% to (about) 40% (w/w).

The following fats and/or oils may e.g. be admixed with the chocolate mass in a method of the invention: anhydrous butyric fat, milk fat, palm oil, soja oil, rapeseed oil, cotton seed oil, palm kernel oil, coprah oil; and possibly their fractions (of any of these) and/or interesterified forms (of any of these). In particular those of vegetable origin such as palm oil, soja oil, rapeseed oil, cotton seed oil, palm kernel oil, coprah oil; and possibly their fractions (of any of these) and/or interesterified forms (of any of these) may be used. These vegetable fats may be combined with animal fats like milk fat and/or anhydrous butyric fat, and possibly their fractions (of any of these) and/or interesterified forms (of any of these). As mentioned before, lauric fats/oils should preferably not be used in e.g. a filling.

In a preferred embodiment of the invention, the chocolate composition has a Trans Fatty Acid content below 10%, preferably below 5% and most preferably below 2% or below 1%.

A preferred embodiment of the invention relates to real chocolate fillings or toppings. Such fillings and toppings advantageously have a fat content of between (about) 34% and (about) 80%, more preferably of between (about) 40% and (about) 60%.

The filling can be afterwards admixed with between 0% and 40%, between 5% and 40%, more preferably between 10% and 30% of sugar syrup, fondant sugar and/or flavor (s). Percentages are weight percentages on the total weight of the final product.

Also provided in the present invention are real chocolate fillings extruded in block shape (e.g. with a minimal mass of 3 kg). Another aspect of the invention relates to a package, containing a product of the invention, such as an extruded filler e.g. in block shape.

Yet another aspect of the invention relates to a food product comprising a chocolate composition of the invention, such as chocolates, chocolate bars, pralines, cookies and/or pastry.

A further aspect of the invention concerns the use of a chocolate product as filling or topping in or on chocolates, chocolate bars, pralines, cookies and/or pastry.

DESCRIPTION

The Chocolate

By "chocolate" or "real chocolate" is meant a chocolate that requires tempering such as dark chocolate, milk chocolate, household chocolate and/or white chocolate as described in the directive 2000/36/EC of the European parliament and the council, which relates to cocoa and chocolate products intended for human consumption (23 Jun. 2000, directive incorporated by reference herein).

The chocolate compositions of the invention are prepared by admixing a given amount of chocolate ("the chocolate mass") with a blend of a fat and/or oil as further defined. The chocolate mass may be in liquid or solid form (any form: grains, pellets, blocks, . . . )

The method of the invention allows the preparation of chocolate compositions (e.g. real chocolate fillings) comprising at least more than 10%, 15%, even more than 20% of cocoa butter (w/w, on the final product). Preferred chocolate compositions according to the invention comprise between 20% and 80% of chocolate, more preferably between 50% and 80% of chocolate, most preferably between 50% and 60% (w/w, on the final product).

Chocolate Fillings

Preferred products according to the invention are real chocolate fillings or chocolate fillings prepared from real chocolate (definition above).

Such fillings are prepared by mixing (about) 20% to (about) 80%, more preferably (about) 40% to (about) 60% of chocolate (having a fat content of minimally 18%, more preferably of between (about) 25% to (about) 35% (w/w)) with a blend of oil and/or fat of vegetable and/or animal origin (see below). A preferred filling is a "real chocolate filling" or a chocolate filling comprising more than 50% of chocolate, advantageously comprising from (about) 50% to (about) 80%, most preferably from (about) 50% to (about) 60% of chocolate.

The filling should preferably have a fat content between (about) 34% and (about) 80%, more preferably between (about) 40% and (about) 60%, and can be afterwards admixed with (about) 0% to (about) 40%, (about) 5% to (about) 40%, more preferably (about) 10% and 30% of a blend of sugar syrups, polyol syrups, fiber syrups, fondant sugar and/or flavors (e.g. natural flavors, nature identical flavors, essential oils, fruit compounds), the total of ingredients (chocolate, fat/oil, the above additives) not exceeding 100%. The syrup, fondant sugar and flavors added should preferably not have a water activity above 0.8 (as measured e.g. with a water activity meter Aqua Lab CX3 from Decagon)

The Fat and/or Oil Added

In the method of the invention a chocolate mass is admixed with a blend of an oil and/or fat having a Solid Fat Content higher than 2% when measured at 30° C. with IUPAC method 2.150 a, and having a Trans Fatty Acid Content below 4%, preferably below 2% or below 1%. This allows the preparation of trans-free chocolate compositions such as chocolate fillings, in particular chocolate compositions (e.g. fillings) with a TFA content lower than 2% or even lower than 1%.

Preferably the fat and/or oil are of a non-lauric and non-hydrogenated origin or source. Advantageously the fat and/or oil are non-lauric non-hydrogenated fats/oils.

The (vegetable) fat and/or oil added should preferably not be a lauric fat. This is meant by "being of non-lauric origin". A non-lauric vegetable fat typically contains less than 4% by weight of lauric acid.

If low trans-fat products are desired, preferably no or only a minor amount of partially hydrogenated fats are used in the blend. Preferably the amount of partially hydrogenated fats on the final product is then less than 0.1% (w/w). This is meant by "being of non-hydrogenated origin".

By "hydrogenated fats/oils" is meant the type of hydrogenated fats/oils that are obtained after a (partial) hydrogenation process, a process which is commonly used to change the physical properties of a fat or oil (e.g. to harden the fat or oil). The (partial) hydrogenation process, as is known, gives rise to trans fatty acids. Interesterification does not involve partial hydrogenation and does not give rise to Trans Fatty Acids.

Advantageously no cocoa butter equivalents, no cocoa butter replacers based on hydrogenated fats, and no specialty fats designed to have a crystallization rate comparable to that of CB or that of hydrogenated fats are admixed with the chocolate in a method of the invention.

A CBE is a fat which does not alter physical properties of CB in any mixture with CB. This type of fat therefore must have a composition very similar to that of CB. A CBE composition is a fat composition of which the solid fat content measured at 30° C. with IUPAC method 2.150 a, the fat composition not being subjected to a thermal treatment, differs at least 8% absolute from the solid fat content measured at the same temperature with IUPAC method 2.150b, the fat composition this time being subjected to a thermal treatment program described in that method (see WO 03/053152).

A few particular examples of fats and/or oils that may be used, alone or in combination, are: anhydrous butyric fat, milk fat, palm oil, soja oil, colza oil, cotton seed oil, palm kernel oil, coprah oil, their fractions (of any of these) and/or interesterified forms (of any of these). These are examples of fat and oil additions accepted for use in chocolate products. As mentioned before lauric fats and oils (such as palm kernel oil and coprah oil) are, however less suitable for use in chocolate fillings. This is a limitation of the lauric fat in question and not of the proposed method.

In some preferred embodiments of the invention chocolate compositions were prepared from a mixture of 53% (w/w) of a chocolate, 37% (w/w) of a blend of vegetable oils, and 10% (w/w) of milk fat and/or anhydrous butyric fat.

The Preparation of a Chocolate Mixture/Composition

The chocolate composition prepared in the first step of the method advantageously is then fed to a (cold) scraped surface heat exchanger (SSHE) in a molten state. Typically, the chocolate mixture that is fed to the SSHE has a temperature of between about +40° C. and about +50° C.

The melt may be obtained by admixing the ingredients in molten state and/or by melting the composition after having mixed the different ingredients.

The SSHE

The SSHE used may be any type of scraped surface heat exchanger. Many types of SSHE exist on the market. The Votator® produced e.g. by Waukesha Cherry-Burrell and the SSHEs of the brand "Gerstenberg" (e.g. an SSHE with 4 cylinders, 1 pin unit, 2 cylinders and 1 resting tube) are only a few examples of SSHEs that may be used in the methods of the invention.

The temperature of the scraped surfaces advantageously is between (about) +20° C. and (about) −30° C. Yet preferably a "cold" SSHE is used in a method of the invention. The scraped surfaces of such "cold" SSHE have a temperature below +10° C., below 0° C., preferably below −5° C., more preferably below −10° C. or even below −15° C., which ensures a very rapid cooling.

The cooling of the scraped surfaces may be achieved by a circulating fluid (e.g. water) but advantageously is achieved via the expansion of a gas (like ammonia) and/or a refrigerant.

The cooling temperatures may vary in function of the desired product (mainly texture and viscosity) and the solidification time envisaged. A person skilled in the art will find no difficulties therein.

Excellent results were obtained with a SSHE of the brand "Gerstenberg", the scraped surfaces having a temperature of between (about) −10° C. and (about) −22° C. The cooling time typically was less than 6 minutes at these temperatures. The temperature of the filling coming out the machine ranged from (about) +7° C. to (about) +26° C., in particular from (about) +7° C. to (about) +10° C. The discharge of the pump: 3000 kg/hour.

The products obtained (obtainable) as such were stable and well crystallized.

Crystallization and Stabilization Inside the SSHE

In the SSHE, the molten mixture comprising the chocolate admixed with the blend of (vegetable) oil and/or fat is cooled (chilled), crystallized and stabilized.

The crystallization of triacylglycerols (TAG) of (vegetable) oil or fats involves three different events: the induction of crystallization (i.e., nucleation), crystal growth, and crystal perfection or ripening. Appropriate thermodynamic conditions must exist to start nucleation.

In fact, in a (vegetable) oil/fat, TAG below their melting temperature (i.e., under supercooling conditions) decrease their free energy by undergoing nucleation. Nucleation occurs through the addition of monomers (i.e., TAG) that form aggregates (i.e., lamellas of TAG). The aggregates must reach a critical size before a stable nucleus is obtained. Once a stable nucleus is formed, crystal growth occurs.

Advantageously, inside a ("cold") SSHE, these events occur simultaneously under supercooling conditions.

Stabilization of the crystallization in the method of the invention is obtained when the crystal network gives the highest possible Solid Fat Content at 20° C. for the considered blend of fat and/or oil, and when this Solid Fat Content doesn't fluctuate any longer in function of the time (no recrystallization, no crystal transition will occur)

Extrusion

The extrusion step in the method of the invention is optional. Id est, the chocolate composition prepared according to the method of the invention can be poured into chocolate shells or can be extruded.

Plasticizing Before Further Use

Before use, a simple heating and/or slight working (as known in the art) suffices to obtain a plasticized product which can then be further used, e.g. as filling or topping in or on chocolates, chocolate bars, pralines, cookies and/or all kinds of pastries.

The methods of the invention advantageously and surprisingly resulted in products with an excellent appearance, structure, taste, palatability, stability, shelf life etc. as demonstrated below.

DETAILED DESCRIPTION OF THE INVENTION

The inventors have found a way to prepare chocolate compositions (e.g. fillings) from real chocolate and plain vegetable trans-free fats or oils, in particular plain vegetable trans-free fats and/or oils, which method overcomes the problem of possibly too slow crystallization rates compared to cocoa butter and hardened fats.

Advantageously, with a method of the invention a stable product with the desired texture, taste, palatability etc can be obtained within a very short time period.

Usually, the crystallization and stabilization of a filling containing real chocolate prior to deposit is made through a tempering process.

During tempering, a molten chocolate mixture is subjected to a temperature conditioning process, in particular the molten chocolate mixture is subjected to a process involving cooling and heating, with the aim of stimulating and maximizing crystallization of the fat in a stable crystalline form (the Beta V form).

In traditional tempering processes, the chocolate mass is generally brought to about +40° C. to +50° C., and then cooled to about +26° C. to +29° C. (first step), so that crystallization is initiated. Subsequently, the mass is reheated around 2.0° C. to 4.0° C. (second step) to re-melt most of the unstable crystals in the mass, preserving however a content of stable βV-crystals (Beta V crystals), which melt at a higher temperature than the unstable crystals.

A manual tempering process comprises a spreading and scraping action on a cold marble, typically at room temperature or ambient temperature (about +15° to about +22° C.)

In well-known mechanical tempering techniques, the mass passes through a first and second step (see above) in machinery containing scraped cold surfaces controlled by cooling water, so that heat is removed from the mass then being cooled to a lower temperature. The temperatures of the cold surfaces could advantageously be about +12° C. to about +20° C.

Currently, two-step crystallization processes are thus applied in factory scale production of chocolate. The method of the invention does not require different tempering steps for preparing a high-quality filling, only a deep cooling. In the method of the invention, in fact only the first step (see above) takes place, yet the temperature to which the chocolate composition is cooled is much lower.

Generally, a chocolate based filling requires a firm texture to be deposited into the food product or onto a conveyor belt. This texture can normally be obtained through the cooling in tempering machinery.

However, the tempering/cooling capacity (maximal capability in kilograms pro hour to temper a fat-containing mass having a pre-determined content of crystals) of common tempering machines is generally too low to obtain the required consistency of trans-free filling into an acceptable time.

Acquisition cost of adapted machines to crystallize trans-free fats chocolate filling is expensive.

By a process according to the present invention, a trans-free fat filling containing e.g. more than 50% chocolate is cooled and crystallized in a stable form with the means of a "cold" SSHE such as the VOTATOR® system, without further adaptation of this machinery.

Typically, molten fat is introduced into (fed to) the VOTATOR® system under pressure by means of a feed pump and conduit into a standard "A" unit, wherein the fat is partially crystallized, and passed into a "B" unit by means of another conduit. After working by agitation in the "B" unit, the fat may be conveyed through a conduit through a "C" unit, wherein it is further worked and cooled and subsequently fed through an extrusion valve to a fill line, the necessary pressure or force being provided by a booster pump. The "B" unit is not absolutely necessary but advantageous as is the "C" unit.

In the present invention, trans-free fat fillings containing e.g. more than 50% real chocolate are crystallized and stabilized inside a (cold) SSHE. Due to direct expansion of a gas like ammonia or other refrigerants, the scraped surface is generally cooled to a temperature from about −10° C. to about −22° C. The cooling time typically is less than G minutes at this temperature. Generally, the temperature of the filling coming out the machine ranges from (about) +7° C. to (about) +26° C., e.g. from (about) +7° C. to (about) +10° C.

In function of the desired texture and crystalline form, the filling can be poured into half liquid state in a box or can be extruded.

After working by slight agitation and/or heating (techniques well known in the art), the well crystallized filling may be "plasticized", in particular "softened without melting the entire fat fraction", so that it can be filled or used into the food product, or deposited onto a conveyor belt.

Trans-free fat fillings containing more than 50% chocolate prepared according to the invention, even upon the application of rather drastic cooling techniques, constituted:

A. Stable fillings suitable for use in e.g. chocolate bars or pralines, without damage on the chocolate layers (e.g. fat blooming) when stored for a longer period (e.g. for more than 3 months) and/or when stored at temperatures below the melting temperature of the filling.

B. Fillings for which the melting behavior and palatability are comparable to fillings produced from fresh cream. However, in the present invention, the shelf life of fillings could be prolonged more than twice in comparison with fillings produced with fresh cream.

C. Fillings being able to be used under plasticized form after working by slight agitation and/or heating. As such, the worker is no more obliged to cool and crystallize the filling before using. This avoids the uncertainty of obtaining a badly crystallized filling.

The invention will be described in further details in the following examples by reference to the enclosed drawings, which are not in any way intended to limit the scope of the invention as claimed.

EXAMPLES

Example 1

Composition of a Chocolate Filling Subjected to Comparative Tests

In the present example a chocolate filling was prepared by admixing 53% of a white chocolate (sugar: 49.2%, whole milk powder: 27.6%, cocoa butter: 22.7%, lecithin: 0.5%, flavor: vanillin), 37% of a vegetable oil blend prepared from palm oil and a fraction of palm oil, and 10% of milk fat. This composition was melted at a temperature of +50° C.

The blend prepared from palm oil and a fraction of palm oil that was admixed had the following characteristics:
  Iodine value: 55-64
  Solid Fat content (%): 20° C.:2-10, 30° C.:1-4, in particular around 3, 35° C.:max.2
  Fatty acids profile: C16:0=35, C18:0=5, C18:1=46, C18:2=12+minor components The chocolate filling composition was cooled and crystallized in a "cold" scraped surface heat exchanger of the brand "Gerstenberg" with the following configuration: 4 cylinders, 1 pin unit, 2 cylinders and 1 resting tube.

The expansion of ammonia cooled the surfaces of the cylinders to a temperature of between about −17° C. and about −22° C. The rotation speed of the pin unit was between about 20 and about 80 rpm. The temperature of the chocolate filling composition, upon leaving the cooling unit of the crystallizer, was between +7° C. and +10° C.

A cooled filling as such obtained can be poured in boxes or can go to a resting tube to become hard before extrusion in blocks of about 3 kg.

The chocolate filling crystallized in the "Gerstenberg" scraped surface heat exchanger is further referred to as the "TEST" sample.

The characteristics of this "TEST" sample are compared with those of the same filling recipe tempered according to a classical manual tempering method and then cooled from +30° C. to +15° C. without agitation in a fridge (fridge temperature: +13° C.). The "classically tempered" filling is further referred to as the "WITNESS" sample.

Example 1A

Quality of Crystallization

The difference in crystallization when using a method of the invention compared to a classical method can be visualized by DSC measurements. The upper curve in FIG. 1 gives a DSC scan as obtained for the "TEST" sample whereas the lower curve gives the DSC scan as obtained for the "WITNESS" sample (see Example 1).

The DSC scans were recorded on a DSC821e from Mettler-Toledo. The temperature program that was applied: stabilization for 5 minutes at −10° C., heating at 5° C./min to 80° C.

The melting of crystals present in the samples analyzed give rise to endothermic peaks on the thermogram. The temperature of melting of the crystals (i.e. the position of the peak on the x-axis) indicates the presence of one particular type of crystals. The "TEST" sample and the "WITNESS" sample present clearly different crystals.

The "WITNESS" sample further has a sandy (granular) texture and sample "TEST" has a smooth (homogeneous and fine) texture. Under an optical microscope the crystals of the "TEST" sample are homogeneously spread throughout the composition, whereas in the "WITNESS" sample this spread was not homogeneous.

Example 1B

Crystallization Time

Different tempering and crystallization techniques were compared with respect to the crystallization time needed to obtain the desired product. The method of the invention was thereby compared with different classical (manual and mechanical) techniques.

A blend (the chocolate composition of Example 1) at 42° C. was either manually tempered on a marble at room temperature (here 20° C.±0.2° C.), or crystallized according to the invention.

After 60 minutes of manipulation (spreading and scraping action) on the marble, the filling reached a temperature of about +21° C. but its viscosity did not increase in a way to permit the use of the obtained product in chocolate and/or patisserie applications. The desired texture, viscosity and quality could not be obtained.

The crystallization time of the same blend (at a temperature of about +38° C.) was then determined for a tempering machine of the type "Selmi" with a capacity of 20 kg.

Nine kilos of the same blend were cooled in this (continuous) tempering machine with a temperature setting of +10° C. for the storage tank and cooling unit.

From t=0 onwards, the temperature evolution of filling coming out of the cooling unit was the following Table 1):

TABLE 1

| Time (minutes) | Temperature(° C.) |
| --- | --- |
| 15 | 23.5 |
| 30 | 23.9 |
| 50 | 23.6 |
| 60 | 23.7* |
| 75 | 21.7 |
| 90 | 20.8 |
| 100 | 20.7 |
| 120 | 20.4 |
| 210 | 20.4 |

*Sample picking

After 210 minutes, the filling showed the requested level of crystallization and texture to be poured into molded chocolates.

However, at this time, the texture of this filling had not yet the required viscosity to be extruded for enrobing applications.

500 gram samples at a temperature of about 23.7° C. (t=60 minutes) have been picked out from the cooling unit and were stored in a fridge at a temperature of about +13° C. After a further storage time of 50 minutes in the fridge, this sample obtained finally had the required texture to be extruded. The required texture was thus obtained only after 110 minutes and with an additional cooling step.

When the same mixture (at a temperature of about +40 to about +50° C.) was fed to a scraped surface heat exchanger of the brand "Gerstenberg", the required texture and viscosity was obtained in a few minutes time only.

Example 2

Texture Analysis

The same blend crystallized in three different ways was subjected to a texture analysis.

The blend (that of Example 1) was either:

Sample 1: Cooled on marble at room temperature (about +20° C.) by a spreading and scraping action, whereby the temperature of the mixture (composition) decreased from about +42° C. to about +22° C. Thereafter the chocolate filling was stored in a fridge at about +13° C. for 24 hours.

Sample 2: Cooled on marble at room temperature (about +20° C.) by a spreading and scraping action, whereby the temperature of the mixture (composition) decreased from about +42° C. to about +30° C. Thereafter the chocolate filling was stored in a fridge at about +13° C. for 24 hours.

Sample 3: Cooled on the scraped surface of a "cold" SSHE of the brand "Gerstenberg" ("TEST" sample), and then stored in a fridge at about +13° C. for 24 hours.

Afterwards, the different samples were stored in a room at about +20° C. for 24 hours before subjecting the samples to a texture measurement through the penetration of a conic probe, using a Texture Analyzer TA-XT plus from Stable Micro Systems. The conic probe used has an angle of 45°, a base of 3 cm and a height of 4 cm.

The penetration of the conic probe in the centre of the sample(s) is made on a distance of 20 mm and a speed of 10 mm/min. During the penetration, the applied force (N) in function of time is measured by way of the following 2 parameters:

Hardness (N): Maximal power applied on the probe to compress the sample.

Force (mJ): Total work delivered by the probe during the total compression.

The results are summarized in Table 2.

TABLE 2

| Sample | Hardness (N) | Force (mJ) |
| --- | --- | --- |
| 1 | 50.08 ± 3.33 | 370.1 ± 13.9 |
| 2 | 43.64 ± 1.34 | 308.7 ± 12.2 |
| 3 | 27.82 ± 1.54 | 212.0 ± 11.3 |

Conclusion: The sample cooled on the scraped surface of a "cold" scraped surface heat exchanger of the brand "Gerstenberg" (sample 3, the "TEST" sample) is significantly softer than the sample cooled on a marble.

Example 3

Shelf Life of Products According to the Invention

Chocolates were filled with the following blend: 85% of the "TEST" product at about +22° C. and 15% syrup of invert sugar.

The evolution of the peroxide value of the chocolate filling is 2 mmol/kg after 6 months and 2.3 mmol/kg after 9 months storage at +15° C.

The evolution of the free fatty acids is 0.87% after 6 months and 1.05% after 9 months storage at +15° C.

After 9 months of storage at about +15° C., the microbiological analysis report of the filling is the following:

| | |
| --- | --- |
| Total aerobic plate count/g (30° C.), ISO 4833 adapted: | <10 |
| Yeasts/g (25° C.), ISO 7954: 1987 adapted: | <10 |
| Moisture/g (25° C.), ISO 7954: 1987 adapted: | <10 |
| *Salmonella*/25 g (37° C.), ISO 6579 adapted: | absent |
| *Enterobacteriaceae*/g (37° C.), ISO 7402: 1985 adapted: | <10 |

The invention claimed is:

1. A method for preparing a chocolate composition comprising at least 10% cocoa butter, comprising the steps of:
    (a) preparing a chocolate mixture comprising at least 10% cocoa butter by admixing a chocolate mass with a blend of a vegetable oil and/or fat having a Solid Fat Content higher than 2% when measured at 30° C. with IUPAC method 2.150 a, and having a Trans Fatty Acid Content below 4%;
    (b) feeding the mixture in a molten state to a scraped surface heat exchanger, wherein the temperature of the scraped surface is below 0° C.; and
    (c) crystallizing and stabilizing said melt with said scraped surface heat exchanger,
    wherein the said blend of a vegetable oil and/or fat to be admixed to the said chocolate mass comprising cocoa butter is free from cocoa butter equivalents, free from cocoa butter replacers based on hydrogenated fats, and free from specialty fats designed to have a crystallization rate comparable to that of cocoa butter or that of hydrogenated fats and
    wherein the fats and/or oils are of vegetable origin and are not cocoa butter.

2. The method of claim 1, wherein the temperature of the scraped surface is below −5° C.

3. The method of claim 2, wherein the temperature of the scraped surface is between about −10° C. and about −22° C.

4. The method of claim 1, wherein the fats and/or oils are of a non-hydrogenated origin.

5. The method of claim 1, wherein the fats and/or oils are of a non-lauric origin.

6. The method of claim 1, wherein said blend further comprises animal fats and/or oils.

7. The method of claim 6, further comprising admixing animal fats and/or oils with the chocolate mass and vegetable fats and/or oils.

8. The method of claim 6, wherein said animal fat is milk fat.

9. The method of claim 1, wherein at least one fat and/or oil of vegetable origin is selected from the group consisting of palm oil, soja oil, rapeseed oil, cotton seed oil, palm kernel oil, coprah oil, and their fractions and/or interesterified forms.

10. The method of claim 1, wherein the chocolate mass is comprised of dark chocolate, milk chocolate, household chocolate, white chocolate or any mixture thereof.

11. The method of claim 1, wherein the chocolate composition comprises about 20% to about 80% chocolate.

12. The method of claim 11, wherein the chocolate composition comprises about 40% to about 60% of chocolate.

13. The method of claim 12, wherein the chocolate composition comprises about 50% to about 60% of chocolate.

14. The method of claim 1, wherein the chocolate composition has a Trans Fatty Acid content below 2%.

15. The method of claim 1, wherein the chocolate composition is a chocolate filling or topping with a fat content between about 34% and about 80%.

16. The method of claim 15, wherein the chocolate filling or topping has a fat content between about 40% and about 60%.

17. The method of claim 1, further comprising the step (e) of plasticizing the product obtained after step (c) or (d) via a light heating and/or mechanical working.

18. A chocolate composition prepared by the method according to claim 1, wherein said chocolate composition further comprises anhydrous butyric fat.

19. The chocolate composition of claim 18, wherein the fats and/or oils added are of a non-hydrogenated origin.

20. The chocolate composition of claim 18, further comprising animal fats and/or oils.

21. The chocolate composition of claim 20, further comprising animal fats and/or oils admixed with the chocolate mass and vegetable fats and/or oils.

22. The chocolate composition of claim 20, wherein said animal fat is milk fat.

23. The chocolate composition of claim 18, wherein the chocolate mass comprises dark chocolate, milk chocolate, household chocolate, white chocolate or any mixture thereof.

24. The chocolate composition of claim 18, comprising about 20% to about 80% chocolate, wherein said fats and/or oils of vegetable origin further comprise at least one ingredient selected from the group consisting of palm oil, soja oil, rapeseed oil, cotton seed oil, palm kernel oil, coprah oil, their fractions and interesterified forms.

25. The chocolate composition of claim 24, wherein the chocolate composition comprises about 40% to about 60% of chocolate.

26. The method of claim 1, wherein from about 20% and about 80% of the blend of vegetable oil and fat is admixed to form the chocolate mixture.

27. The chocolate composition of claim 18, having a Trans Fatty Acid content below 2%.

28. The chocolate composition claim 18, which is a chocolate filling or topping.

29. The chocolate composition of claim 28, having a fat content of between about 34% and about 80%.

30. The chocolate composition of claim 28, wherein said composition is further admixed with between 0% and 40 of sugar syrup, fondant sugar and/or flavor(s).

31. The chocolate composition of claim 30, wherein said composition is further admixed with between 10% and 30% of sugar syrup, fondant sugar and/or flavour(s).

32. A food product comprising the chocolate composition of claim 18.

33. The food product of claim 32, selected from the group consisting of chocolates, chocolate bars, pralines, cookies and pastry.

34. The method of claim 1, further comprising, after step (c), extruding the chilled mixture in block shape.

35. The method of claim 1, wherein said blend further comprises anhydrous butyric fat.

36. The chocolate composition of claim 29, having a fat content of between about 40% and about 60%.

* * * * *